Nov. 3, 1964   H. T. HALIBRAND   3,155,200
SELF BIASED COLLET AND SEAL RETAINER FOR DISC BRAKES
Filed Feb. 4, 1963

INVENTOR.
HENRY T. HALIBRAND
BY
Wm. H. Maxwell
AGENT

United States Patent Office 3,155,200
Patented Nov. 3, 1964

3,155,200
SELF BIASED COLLET AND SEAL RETAINER
FOR DISC BRAKES
Henry T. Halibrand, 1510 W. 228th St.,
Los Angeles, Calif.
Filed Feb. 4, 1963, Ser. No. 255,948
5 Claims. (Cl. 188—196)

This invention relates to wheel brake units for vehicles and is specially concerned with spot disc brake units and improved means to snub and continuously reposition the release units of the brake units.

The spot disc brake is in use universally on high performance vehicles such as aircraft and in particular on racing cars. These brakes are installed at the individual wheels as separate units that operate independently from a central source of hydraulic pressure when the pilot or driver applies braking force. The brake unit under consideration involves a C-shaped brake housing with a backing plate at one side and a cylinder at the other side on an axis normal to said backing plate. The disc operates between brake lining carried by the backing plate and piston respectively, the piston being moved by fluid pressure applied to the cylinder and into pressured engagement with the disc. The difficulties arise in the release of the piston and its lining, so that it separates completely from the disc to thereby also release the backing plate and its lining for complete separation. The said release and complete separation is necessary in order to be assured that the brake unit will not drag upon the disc when in a normally released condition.

Brake units of the type under consideration have a release unit with an indicator that projects visibly from the cylinder. The indicator moves and is repositioned continuously as the brake lining wears, but it must effectively hold its reset position against the return spring pressure. Heretofore, the continued resetting of the release unit position has not been entirely reliable since a positive quantity of frictional resistance to movement of the indicator has not been maintainable. Various ways of determining said frictional resistance have been resorted to, including the use of permanently out-of-round deformed rings, the use of manually variable nuts that tighten or loosen one or more friction rings, or by the selective application of split friction rings, and the like. In any case, the frictional resistance to positioning of the release unit indicator has not been positively set or maintained in relationship to tension of the return spring that must be employed. Further, the condition referred to is aggravated by the substantial tension of said return spring, 100 lbs. spring tension being usual in a brake unit having a 2 to 3 inch piston diameter.

As a result of the foregoing state of the art it is not uncommon for the release unit indicator to slip and for the brake lining to drag, all as a result of unpredictable action of the snubber means that is provided in order to permit repositioning of the release unit.

An object of this invention is to provide an improved release unit snubber for disc brake units having characteristics above referred to, and a snubber which establishes predetermined and predictable resistance to movement of the release unit.

Another object of this invention is to provide a snubber for uniformly engaging the indicator of a release unit of a brake of the character above referred to.

It is an object of this invention to provide a self-centering snubber for disc brake units of the character above referred to and which uniformly centers the indicator of the brake unit and with virtually no tendency to bind.

It is also an object of this invention to provide a snubber ring which occupies a minimum axial distance and which thereby avoids encumbering the brake apparatus.

It is also an object of this invention to provide a snubber ring for disc brakes of the character above referred to and which remains of uniform concentric formation and so as to act properly in the capacity of an O-ring seal container.

The various objects and features of this invention will be fully understood from the following detailed description of the typical preferred form and application thereof, throughout which description reference is made to the accompanying drawings, in which.

Figure 1:
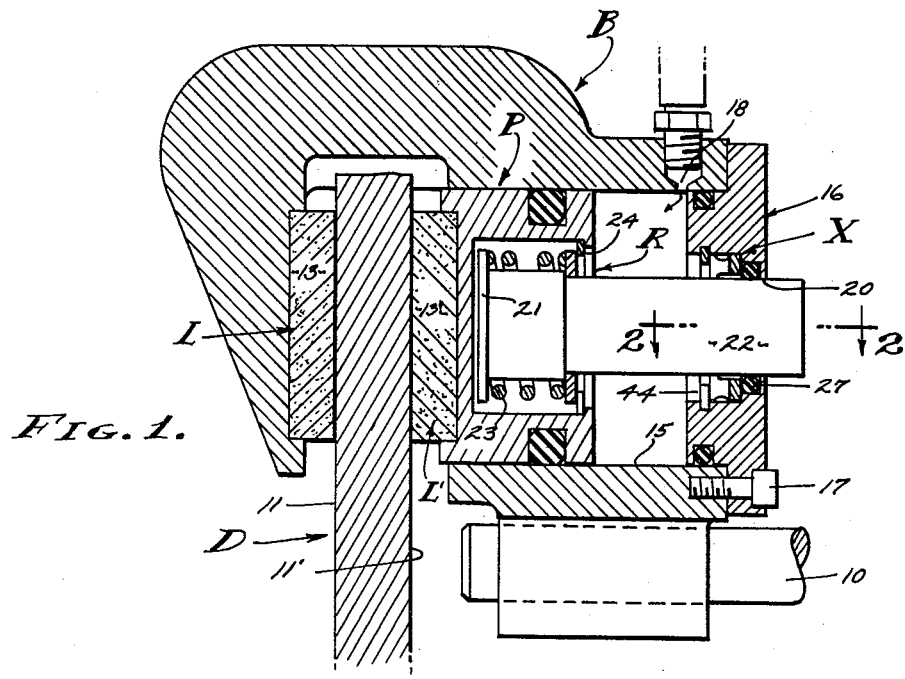
FIG. 1 is a detailed sectional view taken through a typical brake unit of the type under consideration and showing the snubber of the present invention installed therein.

In the drawings I have shown, generally the elements which comprise a brake unit, for example, such a unit as used on a high performance racing car. As shown, there is a disc D (shown partially) and a body or housing B engaged over the peripheral portion of the disc. The housing B is a C-shaped element with the opening thereof faced radially inward toward the central axis of the wheel (not shown) and disc D, and the said housing is shiftably supported on rods 10 that permit it to have limited movement axially of and parallel to the said central axis. As a result of this general configuration, the disc D is opposed by the two opposite sides of the C-shaped housing B, and it is at these two opposite sides of the housing B where the lining L and L' is installed to be pressed against the said disc at opposite side faces 11 and 11' thereof. The said faces 11 and 11' of the disc are flat and parallel with each other.

The lining L is installed at one side of the C-shaped housing B, at the backing plate side 12, there being a recess therein to receive the puck 13 of lining material. The lining L' is installed at the other side of the C-shaped housing B on a movable piston P, there being a recess in the piston P to receive the puck 13' of lining material.

The two linings L and L' are aligned on a common axis extending normally through the peripheral portion of the disc D and the housing B is characterized by a cylinder bore 15 on the said common axis and through which the piston P travels. Since the opening in the C-shaped housing B is less than the required length of piston P, and for manufacturing purposes, the cylinder bore 15 opens at the outside of the housing B where it is closed by a head 16 secured to the housing B by a circumferential series of fasteners 17. There is an O-ring seal surrounding the piston P and engaging the cylinder bore 15. Thus, with the piston P in the bore 15 and with the head 16 in place, there is a chamber behind the piston P whereby pressure can be applied through a fluid port 18 in order to hydraulically press the two linings L and L' together with the disc D therebetween.

In accordance with brake units of the type under consideration there is a release unit R that operates to permit the above mentioned pressured engagement of the linings L and L' and which also retracts the piston P and lining L' when fluid pressure is withdrawn. The release unit R also acts as an indicator to show the amount of wear on the linings and projects visibly from the head 16 for this purpose. Therefore, the head 16 is provided with a reduced bore 20 to pass the release unit R so that said unit is movable in said reduced bore 20.

The release unit R is characteristic of this type of brake unit and comprises a head 21 at its inner end and a cylindrical stem or indicator 22 projecting therefrom and through the reduced bore 20. The head 21 is normally engaged flat within a recess in the back of the piston P under the expanded pressure of a spring 23 seated at the back of the piston by means of a snap ring 24 surrounding the indicator 22. Therefore, the piston P can move forwardly relative to the indicator 22 by compressing the spring 23 which in actual practice requires a force of about 100 lbs., the normal distance of movement or compressing being approximately .010 to .025 inch.

In order for the brake unit to operate properly the indicator 22 must be gripped tightly enough to resist movement through the normal compression of spring 23, through a distance of said approximate .010 to .025 inch. When this proper grip is maintained, then and only then is the release unit properly operable. Therefore, successful operation of the brake unit is dependent upon a reliable snubber having a positive predetermined action.

In accordance with this invention I provide an independently operable snubber X in the form of a self-biased collet and seal retainer. It is significant that the snubber X is a complete 360° ring, that it is absolutely concentric in every respect, that it is positioned longitudinally by flat normally disposed faces, and that it is free to expand its outside diameter as circumstances require. Moreover, the snubber X is integrally formed of a single body, preferably of durable metal, or the like, having the necessary inherent resilience for self-biasing into positive pre-determined pressured engagement with the indicator. In the particular application shown, where the spring 23 exerts a force of about 100 lbs., the snubber X creates frictional resistance to longitudinal movement of the indicator in the range of about 175 lbs.

The snubber X enters into the head 16 from the forward side thereof to seat at the bottom of a double counterbore 25. The first step or counterbore 26, intermediate the bore 20 and double counterbore 25, is of mediate diameter and thereby establishes an annular groove of determined axial as well as radial extent. An O-ring seal 27 is carried in the annular groove of counterbore 26, the front side of the seal 27 being exposed at the plane of the bottom of the said double counterbore 25. Thus, it will be apparent that a fluid seal surrounds the projecting indicator 22 as it movably passes through the bore 20.

The snubber X comprises a body section 30 and a circumferentially disposed series of axially extended fingers 40. The body section 30 and fingers 40 are formed of a single body of resilient material, preferably of metal. The function of the snubber X is to retain the seal 27 and mainly to frictionally engage the indicator 22, the fingers 40 being biased by the resilience of the body and finger formation per se.

Figure 2:
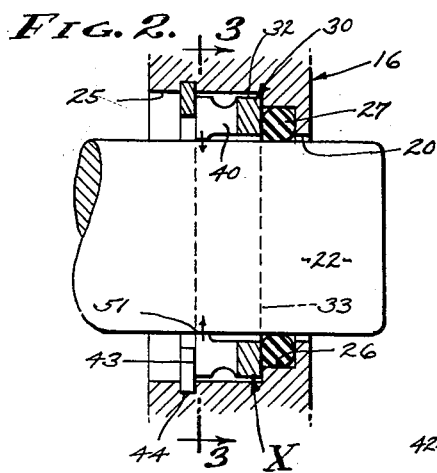
FIG. 2 is an enlarged detailed sectional view of a portion of the unit and taken as indicated by line 2—2 on FIG. 1.
Figure 3:
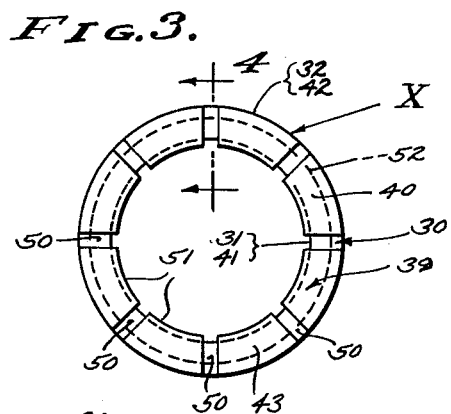
FIG. 3 is an elevation of the snubber ring per se, removed from the brake unit and taken as indicated by line 3—3 on FIG. 2.
Figure 4:
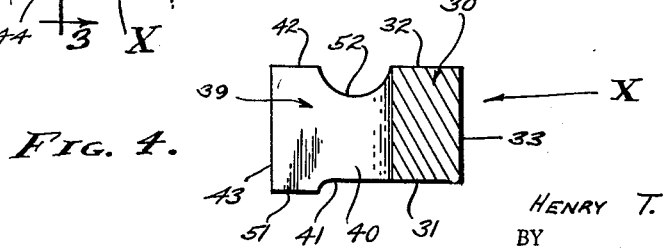
FIG. 4 is a section taken as indicated by line 3—3 on FIG. 3.

The body 30 is a true concentric ring, having inner and outer diameters 31 and 32 of true cylindrical form. The said outer diameter 32 is somewhat less than the diameter of counterbore 25, as shown best in FIG. 2. The backface 33 is in a flat plane that extends between the diameters 31 and 32 in a plane exactly normal to the central axis of the structure. The front of the ring-shaped body is determined by the depth of slots to be cut therein as later described, so that the said body is a continuous uninterrupted ring, basically and preferably of the rectangular cross-section shown.

The fingers 40 are formed of the axial extension 39 of the body 30, said extension being of cylindrical formation, continuations 41 and 42 of the inner and outer diameters of the above described diameters 31 and 32. As shown, the forward ends of the fingers are established by a common front face 43 in a flat plane that extends between the diameters 41 and 42 in a plane normal to the axis and exactly parallel to face 33. The said front face 43, or facets as later described, is seated at the forward end of counterbore 25 by means of a snap ring 44.

The position of the snap ring 44 is such as to capture the snubber X in working position with some clearance but with little play. It will be apparent that the snubber X seats on and applies forward axial pressure to the snap ring 44, pressure being exerted by the O-ring seal 27.

There is a plurality of fingers 40, preferably each like the other, for example eight such fingers as shown, in which case four transverse diametrically disposed slots or channels 50 are formed in the axial extension 39, in order to separate the said extension into separated axially extending fingers. The channels 50 are bottomed so as to terminate at the front of the body 30, being of uniform depth, and separate the front face 43 into a plurality of coplanar facets.

A feature of this invention is the special formation of the fingers 40 which are characterized by the pads 51 at their free terminal ends. Although said pads can vary in formation it is significant that it is these localized pads 51 at the forward ends of the fingers 40 which bear radially inward into pressured engagement with the cylindrical extension of the indicator 22. As shown, the inner diameter 31–41 of the snubber X is stepped inward at the pads 51, the said pads 51 also being turned cylindrical for flat frictional engagement with the indicator 22. However, the pads 51 can be rounded, for example, for point contact. In practice, the said turned diameter of the pads 51 can be the same as the diameter of the indicator 22, in which case the fingers 40 are bent or turned inwardly, or the said turned diameter of the pads 51 can be slightly less than the diameter of the indicator 22, in which case the fingers 40 are simply deflected upon assembly. In any case, flat or substantially flat contact is maintained between the fingers pads 51 and the extension diameter of the indicator 22.

Another feature of this invention is the controlled and pre-determinable pressure engagement of the fingers with the indicator 22. As shown in the detailed cross-section of the snubber X the fingers are uniformly and measurably weakened by means of an annular groove 52 turned in the exterior of the diameter 42. The said groove 52 is arcuate or curved in its cross-sectional configuration, so as to avoid fracture points, and the groove 52 is located adjacent to the uninterrupted ring-shaped body 30. However, the groove does not enter nor interfere with the body in any way to permit distortion thereof which could adversely affect the seal 27.

As a result of the configuration shown and described, the fingers 40 press radially inward with pre-determined accuracy and they frictionally engage the indicator 22 to yield only to positive movement exacted by engagement of snap ring 24 with the rear-most shoulder of release unit R, but do not yield to pressure exerted by the spring 23. In carrying out this invention it is readily determined and known that a certain amount of deflection of the spring fingers 40 will result with the application of a certain amount of lateral pressure against the indicator 22. Therefore, the frictional engagement of the fingers 40 can be readily determined in order to prevent movement by means of the spring 23 and to permit movement only by the positive engagement of release unit R with the snap ring 24.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. In combination with a disc brake comprising, a brake housing with a cylinder bore therein, a head closing one end of the bore and having a reduced bore therein, a piston slidably carried in the cylinder bore to project from the other end of the bore and having lining carried on said projecting piston to engage a brake disc, and a release unit for retracting the piston into the cylinder bore and comprising a head recessed in the piston and an indicator stem projecting therefrom and into the said reduced bore, there being a retracting spring urging the piston into engagement with the release unit head, and means retaining the release unit head within the said recess with limited movement, a self biased collet including:
  (a) a ring carried with clearance in said reduced bore and surrounding the indicator stem,
  (b) spring fingers extending longitudinally from the ring and with pads at the terminal ends thereof pressed onto the said indicator stem to frictionally engage the same,
  (c) and an annular groove turned in the outer diameter of the ring at and measurably weakening the fingers for control of said frictional engagement with the indicator stem.

2. A self biased collet and seal retainer for a disc brake comprising, a brake housing with a cylinder bore therein, a head closing one end of the bore and having a reduced bore and counterbore therein, a piston slidably carried in the cylinder bore to project from the other end of the bore and having lining carried on said projecting piston to engage a brake disc, and a release unit for retracting the piston into the cylinder bore and comprising a head recessed in the piston and an indicator stem projecting therefrom and into the said reduced bore, a seal in said reduced bore at said counterbore therein and surrounding the indicator stem, there being a retracting spring urging the piston into engagement with the release unit head, and means retaining the release unit head within the said recess with limited movement, said collet and seal retainer including:
  (a) a ring carried in the said reduced bore and with a face seated at said counterbore to retain said seal and said ring surrounding the indicator stem,
  (b) and spring fingers extending longitudinally from the ring and with pads at the terminal ends thereof pressed onto the said indicator stem to frictionally engage the same.

3. A self biased collet and seal retainer for a disc brake comprising, a brake housing with a cylinder bore therein, a head closing one end of the bore and having a reduced bore and counterbore therein, a piston slidably carried in the cylinder bore to project from the other end of the bore and having lining carried on said projecting piston to engage a brake disc, and a release unit for retracting the piston into the cylinder bore and comprising a head recessed in the piston and an indicator stem projecting therefrom and into the said reduced bore, a seal in said reduced bore at said counterbore therein and surrounding the indicator stem, there being a retracting spring urging the piston into engagement with the release unit head, and means retaining the release unit head within the said recess with limited movement, said collet and seal retainer including:
  (a) a ring carried with clearance in the said reduced bore and with a face seated at said counterbore and retaining said seal and said ring surrounding the indicator stem,
  (b) and spring fingers extending longitudinally from the ring to deflect radially into said clearance and with pads at the terminal ends thereof pressed onto the said indicator stem to frictionally engage the same.

4. A self biased collet and seal retainer for a disc brake comprising, a brake housing with a cylinder bore therein, a head closing one end of the bore and having a reduced bore and counterbore therein, a piston slidably carried in the cylinder bore to project from the other end of the bore and having lining carried on said projecting piston to engage a brake disc, and a release unit for retracting the piston into the cylinder bore and comprising a head recessed in the piston and an indicator stem projecting therefrom and into the said reduced bore, a seal in said reduced bore at said counterbore therein and surrounding the indicator stem, there being a retracting spring urging the piston into engagement with the release unit head, and means retaining the release unit head within the said recess with limited movement, said collet and seal retainer including:
  (a) a ring carried in the said reduced bore and seated at said counterbore and retaining said seal and surrounding the indicator stem,
  (b) spring fingers extending longitudinally from the ring and with pads at the terminal ends thereof pressed onto the said indicator stem to frictionally engage the same,
  (c) and an annular groove turned in the outer diameter of the ring at and measurably weakening the fingers for control of said frictional engagement with the indicator stem.

5. A self biased collet and seal retainer for a disc brake comprising, a brake housing with a cylinder bore therein, a head closing one end of the bore and having a reduced bore and counterbore therein, a piston slidably carried in the cylinder bore to project from the other end of the bore and having lining carried on said projecting piston to engage a brake disc, and a release unit for retracting the piston into the cylinder bore and comprising a head recessed in the piston and an indicator stem projecting therefrom and into the said reduced bore, a seal in said reduced bore at said counterbore therein and surrounding the indicator stem, there being a retracting spring urging the piston into engagement with the release unit head, and means retaining the release unit head within the said recess with limited movement, said collet and seal retainer including:
  (a) a ring carried with clearance in the said reduced bore and with opposite parallel faces disposed normal to the axis of the structure, one of said faces being positioned by a releasable element and the other of said faces seated at said counterbore and retaining said seal and said ring surrounding the indicator stem,
  (b) spring fingers extending longitudinally from the ring to deflect radially into said clearance and with pads at the terminal ends thereof pressed onto the said indicator stem to frictionally engage the same,
  (c) and an annular groove turned in the outer diameter of the ring at and measurably weakening the fingers for control of said frictional engagement with the indicator stem.

References Cited in the file of this patent

UNITED STATES PATENTS

| 2,803,314 | Halibrand | Aug. 20, 1957 |
| 2,888,104 | Frayer | May 26, 1959 |
| 2,900,052 | Frayer et al. | Aug. 18, 1959 |
| 3,085,663 | Jakeways | Apr. 16, 1963 |

FOREIGN PATENTS

| 94,754 | Norway | Oct. 5, 1959 |